United States Patent
Yamasaki

(10) Patent No.: US 7,711,254 B2
(45) Date of Patent: May 4, 2010

(54) ELECTRONIC BLUR CORRECTION DEVICE AND ELECTRONIC BLUR CORRECTION METHOD

(75) Inventor: Masafumi Yamasaki, Hachioji (JP)

(73) Assignees: Olympus Imaging Corp., Tokyo (JP); Olympus Corporation, Tokyo (JP)

( * ) Notice: Subject to any disclaimer, the term of this patent is extended or adjusted under 35 U.S.C. 154(b) by 469 days.

(21) Appl. No.: 11/713,216

(22) Filed: Mar. 2, 2007

(65) Prior Publication Data

US 2007/0212045 A1  Sep. 13, 2007

(30) Foreign Application Priority Data

Mar. 10, 2006 (JP) .............................. 2006-065490

(51) Int. Cl.
G03B 17/00 (2006.01)
G03B 7/083 (2006.01)
G03B 7/093 (2006.01)
H04N 5/228 (2006.01)
H04N 5/235 (2006.01)

(52) U.S. Cl. ...................... 396/55; 396/246; 348/208.1; 348/208.4; 348/208.6; 348/208.12; 348/229.1

(58) Field of Classification Search .................. 396/55, 396/52, 54, 215, 246; 348/208.99, 208.1, 348/208.4, 208.6, 208.12, 297
See application file for complete search history.

(56) References Cited

U.S. PATENT DOCUMENTS

2004/0061796 A1* 4/2004 Honda et al. ................. 348/297

FOREIGN PATENT DOCUMENTS

JP  2001-086398  3/2001

* cited by examiner

*Primary Examiner*—Rochelle-Ann J Blackman
(74) *Attorney, Agent, or Firm*—Straub & Pokotylo; John C. Pokotylo

(57) ABSTRACT

A blur correction device is disclosed, which acquires a plurality of time-division images, each captured for a time-division exposure time having a period that is an integral multiple of an image reading cycle of an image pickup device, to generate a blur-corrected image from the plurality of time-division images. According to this blur correction device, since the exposure times for the plurality of time-division images are substantially continuous, an image in which the trajectory of a moving body is continuous can be obtained.

9 Claims, 11 Drawing Sheets 23, 24 : PROGRAMMABLE VARIABLE GAIN AMPLIFIER

| D3 | D2 | D1 | GAIN | ISO SENSITIVITY |
|---|---|---|---|---|
| 0 | 0 | 0 | ×1 | 50 |
| 0 | 0 | 1 | ×2 | 100 |
| 0 | 1 | 0 | ×4 | 200 |
| 0 | 1 | 1 | ×8 | 400 |
| 1 | 0 | 0 | ×16 | 800 |
| 1 | 0 | 1 | ×32 | |
| 1 | 1 | 0 | ×64 | |
| 1 | 1 | 1 | ×128 | |

ABasedonandclaimsthebenefit# ELECTRONIC BLUR CORRECTION DEVICE AND ELECTRONIC BLUR CORRECTION METHOD

CROSS-REFERENCE TO RELATED APPLICATION

This application is based upon and claims the benefit of priority from prior Japanese Patent Application No. 2006-065490, filed on Mar. 10, 2006, the entire contents of which are incorporated herein by reference.

BACKGROUND OF THE INVENTION

1. Field of the Invention

The present invention relates to an electronic blur correction device and an electronic blur correction method capable of effectively compensating for an image blur caused by hand shakes and the like. Particularly, the present invention relates to an electronic blur correction device and an electronic blur correction method for compensating for mutual blurring of a plurality of images continuously shot at a blur tolerable exposure time and combining the images for which a blur is corrected.

2. Description of the Related Art

It is conventionally known that a blur may occur in a shot image due to the influence of photographer's hand movements upon shooting a still image with an imaging apparatus. Therefore, various measures have been taken to prevent this blur problem. For example, Japanese Patent Application Laid-Open No. 2001-86398 discloses an imaging apparatus, which compensates for mutual blurring of a plurality of images obtained during continuous a shooting performed plural times for a short exposure time in which blur is acceptable, and adds the plurality of images to generate a combined image for which a blur is corrected.

It usually takes several tens to hundreds of milliseconds to read an image from an image pickup device. Further, when the focal length of a photographing lens of a 35 mm film camera is f [mm], a blur tolerable exposure time is often set to 1/f [sec] from an empirical perspective. Therefore, if shooting is performed with a photographing lens having, for example, focal length f=100 [mm], the blur tolerable exposure time t is t=1/100 [sec]=10 [msec]. In the blur correction technique as described in Japanese Patent Application Laid-Open No. 2001-86398, if the cycle of reading an image from the image pickup device of the camera is, for example, 100 [msec], exposure is performed intermittently every time period (10 [msec]) equivalent to 1/10 of the reading cycle. Then, a plurality of read, time-division images are compensated for mutual blurring and combined together.

In this case, the time interval from the end of one time-division image exposure to the start of the next time-division image exposure cannot be set shorter that the image reading cycle. Therefore, in the above example, the next time-division image exposure is started after a lapse of 90 [msec] since completion of the previous exposure of 10 [msec].

BRIEF SUMMARY OF THE INVENTION

The electronic blur correction device of the present invention acquires a plurality of time-division images from an image pickup device, each time-division image being captured for a time-division exposure time having a period that is an integral multiple of the image reading cycle, to generate a blur-corrected image from the plurality of time-division images.

An exemplary structure of the electronic blur correction device of the present invention can be represented as follows. An electronic blur correction device for generating a combined image from a plurality of time-division images continuously acquired from an image pickup device by performing time-division imaging and compensated for mutual blurring, the device comprises: an imaging part for converting subject light to an image signal; an image reading part for reading the time-division images, each captured at a predetermined time-division exposure time, from the imaging part; a time-division exposure time control part for controlling the time-division exposure time to be an integral multiple of the reading cycle of an image in the image reading part; a blur compensation part for compensating for mutual blurring of the plurality of images captured by the imaging part; and an image synthesis part for combining the plurality of images compensated by the blur compensation part.

The present invention can also be understood as the invention of an electronic blur correction method.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

A Preferred embodiment of the invention is described below with reference to the accompanying drawings.

Using a digital camera having functions of an electronic imaging apparatus to which the present invention is applied, a preferred embodiment of the present invention will be described below with reference to the accompanying drawings.

Figure 1:
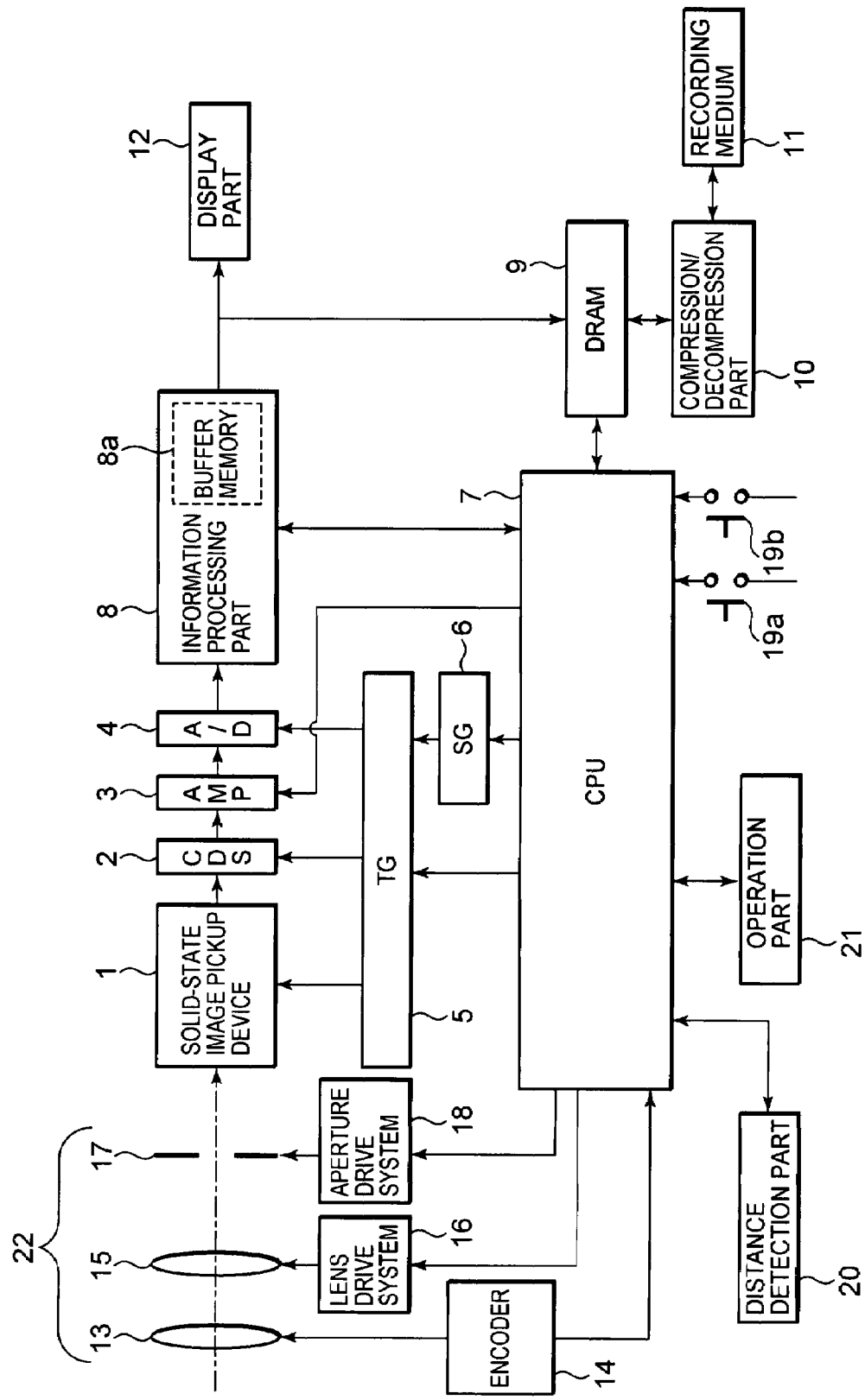
FIG. 1 is a block diagram showing an electric system of a digital camera according to a preferred embodiment to which the present invention is applied.

FIG. 1 is a block diagram primarily showing the electric structure of a digital camera according to the embodiment. This digital camera includes a two-dimensional solid-state image pickup device (which may be generically referred to as "image pickup device" below) 1, a correlated double sampling (CDS) circuit 2, a gain control amplifier (AMP) 3, an A/D converter 4, a timing generator (TG) 5, a signal generator (SG) 6, and a CPU (Central Processing Unit) 7. Further, the digital camera includes an information processing part 8, a DRAM (Dynamic Random Access Memory) 9, a compression/decompression part 10, a recording medium 11, a display part 12, a variator lens 13, an encoder 14, a focus lens 15, a focus lens drive system 16, an aperture 17, an aperture drive system 18, a first release switch 19a and a second release switch 19b, a distance detection part 20, and an operation part 21. The variator lens 13, the encoder 14, the focus lens 15, the focus lens drive system 16, the aperture 17, and the aperture drive system 18 constitute a photographing lens 22.

The variator lens 13 in the photographing lens 22 is an optical system for setting a focal length. The encoder 14 is to detect a position signal corresponding to the focal length of the variator lens 13. The detected position signal is read by the CPU 7 and converted to a focal length of the photographing lens 22. The focus lens 15 is a lens for focusing on a subject. The focus lens 15 is adjusted according to the subject distance detected by the distance detection part 20 so that a desired subject will be in focus. The focus lens drive system 16 drives the photographing lens 22 to an in-focus position in accordance with an instruction from the CPU based on the subject distance information detected by the distance detection part 20. This is a known technique as so-called autofocus control.

The subject distance detection part 20 is to detect information related to the distance to the subject. The subject distance detection part 20 extracts high frequency components using a high-pass filter or the like from luminance components of image data for one frame (one screen) stored in the DRAM 9 to calculate an AF evaluated value corresponding to contour components or the like on the high-frequency side by calculating a cumulative composite value of the extracted high frequency components or the like in order to perform focus detection based on this AF evaluated value. These computations can be performed by the CPU 7. The subject distance detection part 20 uses the above-mentioned detection method based on the high frequency components of image data, but this method can, of course, be replaced with any of various known detection method such as a phase difference method or a light projection method.

The aperture 17 arranged in the photographing lens 22 is an optical aperture for regulating the passing range of an imaging light beam from the photographing lens 22 to adjust the amount of light. The aperture 17 is part of an imaging optical system, and is driven by the aperture drive system 18 based on a control signal from the CPU 7. The CPU 7 partly serving as a photometric part performs exposure computation based on image data stored in the DRAM 9, and the aperture drive system 18 receives a control instruction from the CPU 7 based on the exposure computation result to drive the aperture 17 in order to change the aperture diameter. Such aperture control is known as so-called AE (automatic exposure) control.

Figure 2:
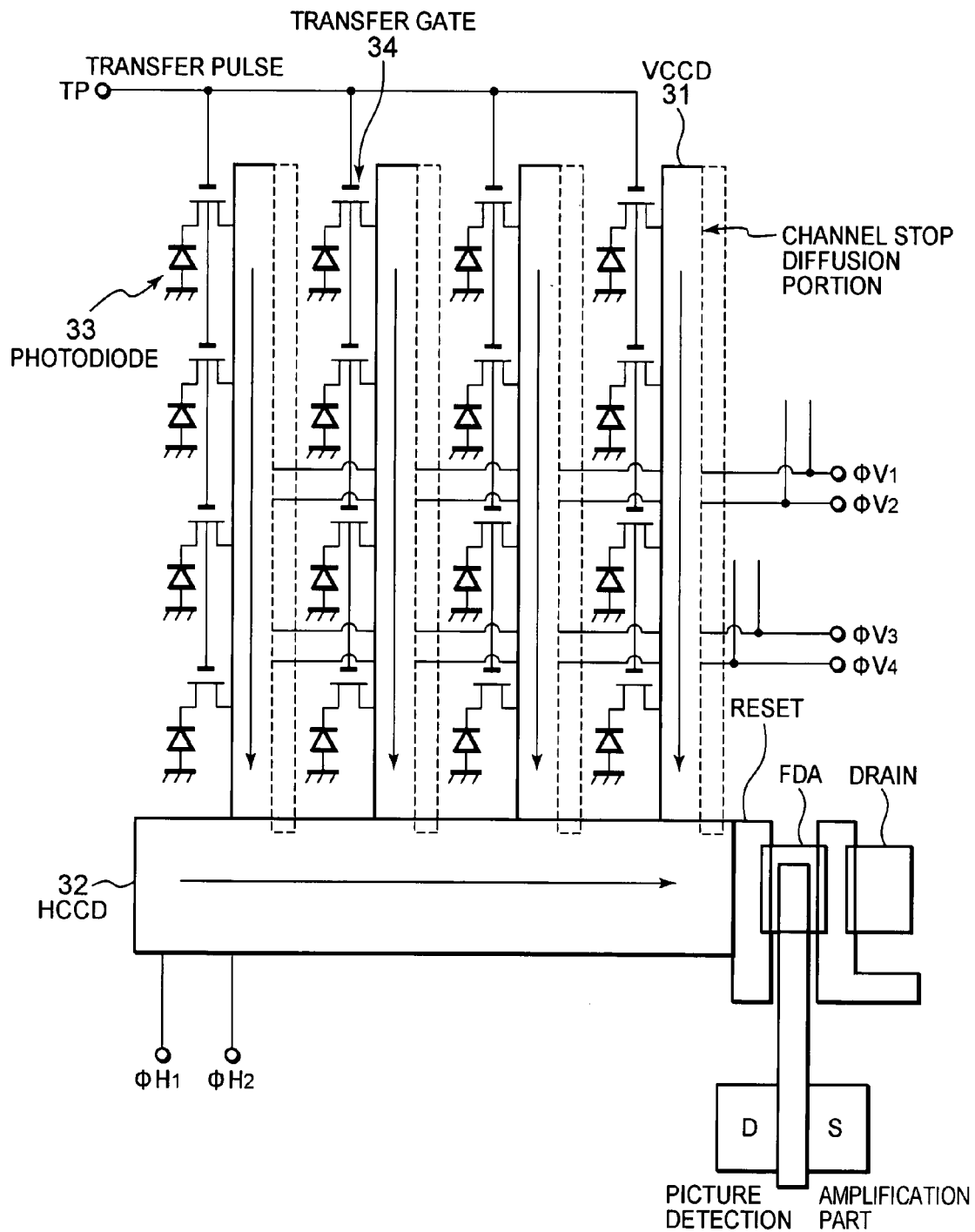
FIG. 2 is a diagram showing the structure of an image pickup device 1 of the embodiment.

The subject beam that has passed through photographing lens 22 produces an image on the image pickup device 1 in which the subject image is captured, photoelectrically converted and output as an analog electric signal. FIG. 2 shows the structure of the image pickup device 1. This image pickup device 1 is a known interline CCD type solid-state image pickup device. In this image pickup device 1, each of vertical transfer CCDs (VCDDs) 31 is arranged as a set with each of linear arrays of photodiodes 33. Then, the VCDDs 31 are connected to a horizontal transfer CCD (HCCD) 32 arranged in a lower portion of the image pickup device. Signal charges photoelectrically converted at the photodiodes 33 are accumulated in their junction capacitances, respectively. Then, upon completion of the accumulation time (exposure period), a shift pulse is applied to each of transfer gates (TP) 34, so that these electric charges for all pixels are shifted to the adjacent VCCDs 31. After the signal charges are read, the photodiodes 33 return to a biased state in which accumulation of signal charges is possible. The signal charges read out to the VCCDs 31 are transferred downward in sync with a clock pulse applied to each of transfer electrodes of the VCCDs 31. When transferred to the undermost end, the signal charges are transferred to the HCCD 32 line by line from the VCCDs 31 and sequentially to the output terminals of the HCCD 32. Then, when the signal charges for one screen are read out, the VCCDs 31 become an empty state in which reading of signal charges accumulated in the photodiodes 33 for the next accumulation time is possible.

For the image pickup device 1, a CCD type solid-state image pickup device having a known vertical overflow structure is adopted. In this structure, the photodiodes (PDs) 33 are formed in p-type diffusion regions (p-wells) formed in the surface of an n-type substrate (for example, an n-type silicon substrate) in such a manner that the p-wells will be fully depleted at a reverse bias voltage VSUB between the p-wells and the n-type substrate. Then, a high-voltage pulse is applied to this VSUB to enable discharge of the electric charges accumulated in the photodiodes 33 to the substrate side. This control of the reverse bias voltage VSUB enables control of the accumulation time of electric charges of the photodiodes 33. In the embodiment, although the interline CCD type solid-state image pickup device is adopted for the image pickup device 1, the present invention is not necessarily limited thereto. For example, the image pickup device 1 can be a frame interline transfer type solid-state image pickup device, or it can, of course, be an MOS (Metal Oxide Semiconductor) type solid-state image pickup device.

Returning to FIG. 1, the timing generator (TG) 5 connected to the image pickup device 1 receives a pulse from the CPU 7 to supply a transfer pulse for driving the image pickup device 1 while supplying various pulses to the CDS 2 and the A/D converter 4 to be described later. The pulse is directly input into the TG 5 from the CPU 7, and is also connected to the signal generator (SG) 6. This SG 6 generates a sync signal under the control of the CPU 7 and outputs the sync signal to the TG 5.

The CDS 2 connected to the output of the image pickup device 1 is driven according to a sample-hold pulse supplied from the TG 5 to perform processing such as a correlated double sampling on image signals output from the image pickup device 1 in order to remove reset noise. The gain control amplifier (AMP) 3 connected to the output of the CDS 2 amplifies analog signals output from the CDS 2. The gain of this AMP 3 is set to an amplification factor or gain according to the ISO (International Organization for Standardization) sensitivity Sv. In other words, the AMP 3 is an ISO sensitivity changing part. The gain of the AMP 3 is also used to amplify a combined image in order to cover a shortfall when the number of images captured in a time-division manner does not reach a specified number. Although the details will be described later, if a slower shutter speed is required to lengthen the exposure time due to some circumstances such as low subject brightness, the resulting image may have a blur under the influence of camera shake or the like. In the embodiment, time-division exposure is repeated at a blur tolerable limit exposure time to obtain a right exposure while combining a plurality of images obtained during the time-division exposure to eliminate the effects of blur. Upon performing the time-division exposure, since the level of image signals for one frame is reduced, the AMP 3 amplifies the combined image to cover the shortfall.

Figure 3:
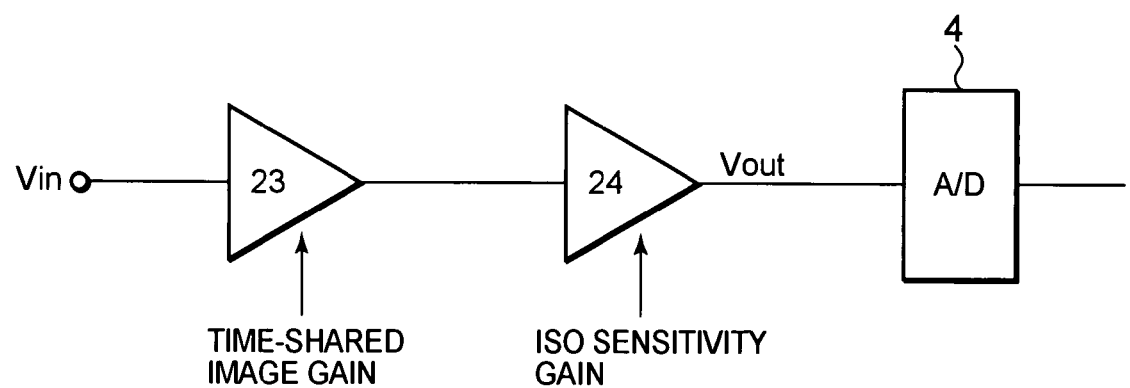
FIG. 3 is a block diagram showing the details of a gain control amplifier AMP of the embodiment.

FIG. 3 shows the structure of the AMP 3. The output of the CDS 2 for removing reset noise is connected to an amplifier 23 having gain A1 as the first stage of the AMP 3. The output of this amplifier 23 is connected to an amplifier 24 having gain A2. The output of the amplifier 24 is connected to the A/D converter 4 to be described later. The gain A1 is set to be a value to cover an insufficient amount of exposure in the time-division exposure, and the gain A2 is set to be a gain according to the ISO sensitivity.

Returning to FIG. 1, the A/D converter 4 connected to the output of the AMP 3 is an analog/digital conversion part for converting an analog signal output from the AMP 3 to a digital signal according to the signal supplied from the timing generator (TG) 5. The information processing part 8 connected to the output of this A/D converter 4 processes a digital pixel signal output from the A/D converter 4 to generate image data. This information processing part 8 has a buffer memory 8a for temporary storage of a plurality of image data (time-division image data) captured by the image pickup device 1 and processed therein.

The DRAM 9 connected to the output of the information processing part 8 is a memory for temporary storage of image data output from the information processing part 8 and image data output from the compression/decompression part 10. Note that the buffer memory 8a can also serve as the DRAM 9, or the DRAM 9 can also serve as the buffer memory 8a. The compression/decompression part 10 connected to the DRAM 9 performs compression according to a compression format such as JPEG (Joint Photographic Coding Experts Group) upon recording image data temporarily stored in the DRAM 9 onto the recording medium 11, and decompression on compressed image data read from the recording medium 11.

The recording medium 11 connected to the compression/decompression part 10 is a recording part for recording image data compressed by the compression/decompression part 10. The recording medium 11 can be, for example, a rewritable nonvolatile recording medium to be removably loaded into the camera body, such as an xD-Picture Card™, a Compact Flash™, an SD Memory Card™, or a Memory Stick™. The display part 12 connected to the information processing part 8 and the DRAM 9 is a monitor for displaying image data output from the information processing part 8 and the DRAM 9. The image data are compressed to reduce the amount of recording space on the recording medium 11, and the compressed image data are decompressed when being displayed on the display part 12.

The first release switch 19a and the second release switch 19b, both connected to the CPU 7, are configured as automatic reset type two-step switches. When a release button (not shown) is pressed, the first release switch 19a is turned on, and when the release button is further pressed, the second release switch 19b is turned on. In other words, when the release button is pressed halfway, the first release switch 19a is turned on, while when the release button is fully pressed, the second release switch 19b is turned on. The first release switch 19a is to input an instruction to start shooting preparation operations. Therefore, when the first release switch 19a is turned on, a distance measurement and light metering operations are performed. On the other hand, the second release switch 19b is to input an instruction to start a shooting operation. Therefore, when the second release switch 19b is turned on, the image pickup device 1 performs an imaging operation to generate image data in the manner as mentioned above. Then, the image data is compressed and recorded on the recording medium 11. The operation part 21 connected to the CPU 7 is an operation part for setting various shooting conditions, such as a shooting mode, a shutter speed value, an aperture value, etc., based on photographer's operations.

As mentioned above, signals from the first release switch 19a, the second release switch 19b, the encoder 14, the operation part 21, etc. are input into the CPU 7, and the CPU 7 outputs instructions to the TG 5, the SG 6, etc. The CPU 7 also outputs control signals to the focus lens drive system 16, the aperture drive system 18, the AMP 3, and the TG 5, respectively. Further, the CPU 7 are bi-directionally connected to the information processing part 8, the DRAM 9, and the distance detection part 20 to control the entire operation of the digital camera including these components. Specifically, the CPU 7 performs the above-mentioned autofocus control and AE control, and controls the driving of the image pickup device 1 based on the signals from the first release switch 19a and the second release switch 19b to instruct capturing of a still image. Further, the CPU 7 performs aperture control to change the opening size of the aperture 17 and exposure time control of the image pickup device 1. Then, based on the output from the operation part 21, the CPU 7 sets a shooting mode of this digital camera and shooting conditions for the digital camera.

Referring next to flowcharts shown in FIGS. 4 to 7, a time-division imaging operation of the digital camera of the embodiment will be described. When the operation of the digital camera is started, it is first determined in step S101 whether the first release switch 19a has been turned on. As a result of determination, if the first release switch 19a is off-state, the digital camera enters a waiting state. Then, when the first release switch 19a is turned on, the procedure goes to step S102 to compute a blur limit exposure time TLimit. This blur limit exposure time TLimit is a time period in which the amount of image blur since the start of exposure supposedly reaches a blur tolerance limit.

The following describes about the blur limit exposure time TLimit. In case of the 35 mm film camera, a film having a frame size of 24 mm wide and 36 mm long (43.28 mm diagonal), so-called Leica frame (also known as "double frame"), is used. As the rules of thumb gained from long experience about the 35 mm film camera, it is known that if the focal length of the photographing lens in millimeters is f, the blur limit exposure time TLimit is $$TLimit \approx 1/f (seconds) \quad (1)$$

In the embodiment, this empirical rule is applied in consideration of the size of a shooting frame, which is set within an effective imaging area of the image pickup device 1 of the digital camera. In other words, since the focal length value of the digital camera is typically represented as equivalent to that of the 35 mm film camera, the focal length equivalent to that of the 35 mm camera is used here.

Returning to FIG. 4, the inverse of the focal length f detected by the encoder 14 is calculated in step S102. Note here that the blur limit exposure time TLimit is not necessarily the value given by 1/f, and any other time-division exposure time not to substantially cause any image blur can be used. It means that any other blur limit exposure time TLimit can be used as long as it is shorter than the exposure time given by the above equation (1).

Then, in step S103, the brightness of the subject is measured. In this light metering operation, the brightness of the subject is computed by monitoring the level of image signals repeatedly output from the image pickup device 1. In other words, the image signals read from the image pickup device 1 are processed by the CDS 2, amplified by the gain control amplifier 3, converted to digital values by the A/D converter 4, and stored temporarily in the DRAM 9 via the information processing part 8. Out of the image data stored in this DRAM 9, a predetermined area of the image data, for example, in the vicinity of the center of the entire image is read by the CPU 7 to determine a combined average value of the level in order to compute the brightness (Bv) of the subject based on the obtained combined average value.

After completion of light metering, the CPU 7 computes control parameters such as an exposure time (time-division exposure time) $\Delta$Texp, the number of time-division imaging times, m, etc. in time-division imaging. The following describes the operation of a subroutine for computation of time-division imaging control parameters with reference to FIG. 5.

First, the optimum exposure time (Texp) is computed (S201). This is to determine an exposure time required to obtain the optimum exposure from an APEX operation based on the brightness obtained by the light metering in step S103. As is known, the APEX operation is to calculate exposure control parameters from the following relationship:

$$Tv+Av=Bv+Sv \qquad (2)$$

(where Tv is Time Value, Av is Aperture Value, Bv is Brightness Value and Sv is Sensitive Value). The optimum exposure time Texp is obtained by converting the APEX value Tv for exposure time into an exposure time. Then, the aperture value Av is calculated from the APEX operation (S202). The exposure time Texp is determined as a value for obtaining the optimum exposure based on light metering, but the present invention is not limited thereto, and it can, of course, be an exposure time manually set by the photographer. Thus, Texp can be a certain exposure time desired by the photographer. The same holds true with respect to the aperture value. Note that the subject brightness value on the right side of the equation (2) is a value determined by the light metering in step S103, and the ISO sensitivity value is a default value or a value entered by the photographer via the operation part 21. Therefore, Tv and Av on the right side of the equation (2) are computed as appropriate along a predetermined program line.

Then, the procedure goes to step S203 in which the blur limit is compared with the exposure time Texp. If TLimit<Texp, since it means that the exposure time Texp is longer than the blur limit exposure time, the procedure goes to step S204 to perform time-division imaging so that blurred image can be corrected. In step S204, an image reading cycle Tf as a cycle of reading an image from the image pickup device 1 is compared with the blur limit exposure time TLimit. Since the image reading cycle Tf varies with a change in the number of frame reading times or the like and the blur limit exposure time TLimit varies with a change in focal length or the like, the time relation varies depending on the blur limit exposure time TLimit and the reading cycle Tf. If the blur limit exposure time TLimit is longer, that is, if Tf<TLimit, it is possible to continuously perform time-division imaging. In this case, the time-division exposure time $\Delta$Texp is set to be an integral multiple of the image reading cycle Tf so that exposures to the image pickup device 1 in the time-division imaging will be continuous in a manner to be described later. This will cause the image obtained by combining the plurality of images acquired in the time-division imaging to have the same effects as an image obtained in normal shooting.

As a result of comparison, if Tf<TLimit, the procedure goes to step S205 to compute [TLimit/Tf] and store the computation result in memory [k] as a new variable k. Note here that [x] denotes an integer to which real number x is rounded down. Then, in step S206, k·Tf is computed by multiplying the reading cycle Tf by k, and the multiplication result is stored in memory [$\Delta$Texp] as the time-division exposure time $\Delta$Texp. Thus, the integer to which TLimit/Tf is rounded down is set as k to set the time-division exposure time $\Delta$Texp k times the image reading cycle Tf. This allows the time-division exposure time $\Delta$Texp to take on values, which are integral multiples of the image reading cycle Tf and smaller than the value for the blur limit exposure time TLimit. This makes a plurality of successive exposure times in the time-division imaging continuous, and blur tolerable time-division images can be obtained. In other words, since the time-division exposure time $\Delta$Texp can be set shorter than the blur limit exposure time TLimit, blur correction can be performed. Further, time-division exposure is continuously performed without unexposure period, and this prevents the trajectory of a high-speed moving body from appearing as discrete dots. In step S206, k is a value obtained by rounding down the fractional part of TLimit/Tf, but if TLimit/Tf is a value larger than 1 (for example, 4 or more), or when highly accurate blur correction is not necessarily required, k can be set to a value in the neighborhood of TLimit/Tf, e.g., an integer rounded up or rounded off. This is because TLimit is just an empirically obtained average value, not a rigorous value.

Next, the procedure goes to step S207 to compute Texp/$\Delta$Texp, and the computed value is stored in memory [A] as amplification factor or gain A of the AMP 3. This can make each time-division image amplified by the AMP 3 at an equivalent level to an image shot at normal exposure time Texp. Then, in step S208, <Texp/$\Delta$Texp> is computed, and the computed value representing the number of time-division imaging times is stored in memory [m] as a new variable m. As mentioned above, <x> denotes an integer to which real number x is rounded down. As will be described later, the plurality of time-division images are compensated for mutual blurring, and these blur-compensated images are combined (added) together. In general, the larger the number of images to be combined, the more the S/N is improved. From this point of view, it can be said that m should be a larger number. However, as m becomes larger, the total shooting time of the time-division images becomes longer and the total amount of blur of the time-division images since the start of imaging becomes larger. Therefore, in the embodiment, m=<Texp/$\Delta$Texp> is set so that the total exposure time of the time-division images, m·$\Delta$Texp, will be the minimum number of time-division imaging times that is not equal to or less than the exposure time Texp in normal shooting. Of course, the number of time-division imaging times, m, may be a smaller value than <Texp/$\Delta$Texp> depending on the S/N level of the combined image. In other words, depending on the S/N level of the combined image, the number of time-division imaging times, m, can be set to any integral value in the neighborhood of Texp/$\Delta$Texp, e.g., that obtained by rounding down or rounding off the fractional part of Texp/$\Delta$Texp. After completion of the processing in step S208, the procedure returns from this subroutine to the main routine of FIG. 4.

Returning to step S204, suppose that Tf<TLimit is not determined as a result of determination in this step, i.e., it is determined that the image reading cycle Tf is equal to or more than the blur limit exposure time. If the time-division imaging is performed at an exposure time ΔTexp equal to or more than the reading cycle Tf, the amount of blur in the time-division images will exceed the blur tolerable range. Therefore, it is necessary to perform the time-division imaging at an exposure time shorter than the reading cycle Tf. In this case, the number of time-division imaging times, m, is first set to [Texp/TLimit]. Then, m is stored in memory [m] (step S209). Next, <Texp/m> is stored in memory <ΔTexp> as the time-division exposure time ΔTexp (step S210). As mentioned above, this time-division exposure time ΔTexp is equal to or less than the image reading cycle Tf. Then, a value equal to the time-division imaging times, m, is stored in memory [A] as the amplification factor or gain A of the AMP 3 (step S211). After that, the procedure returns from the subroutine to the main routine of FIG. 4. In the processing from step S209 to step S211, since the time-division imaging time is shorter than the reading cycle Tf, imaging by the image pickup device 1 is not continuous, resulting in a picture in which a high-speed moving body appears as discrete dots. However, since the time-division exposure is repeated to restrict blur to not more than the blur tolerance limit, blur correction processing can be performed to obtain an image for which blur is corrected.

Returning to step S203, if TLimit<Texp is not determined as a result of determination in this step, i.e., it is determined that the blur limit exposure time TLimit is equal to or more than the exposure time Texp, it means that a signal having the optimum level can be obtained in one blur tolerable imaging operation. In other words, since this situation is the same as normal shooting, "1" is stored in step S212 in memory [m] for storing the number of time-division imaging times. Then, the exposure time Texp is stored in memory [ΔTexp] for storing the time-division exposure time ΔTexp (S213). Then, "1" is stored in memory [A] for storing the amplification factor A of the AMP 3 (S214). After that, the procedure returns from this subroutine to the main routine of FIG. 4.

Figure 4:
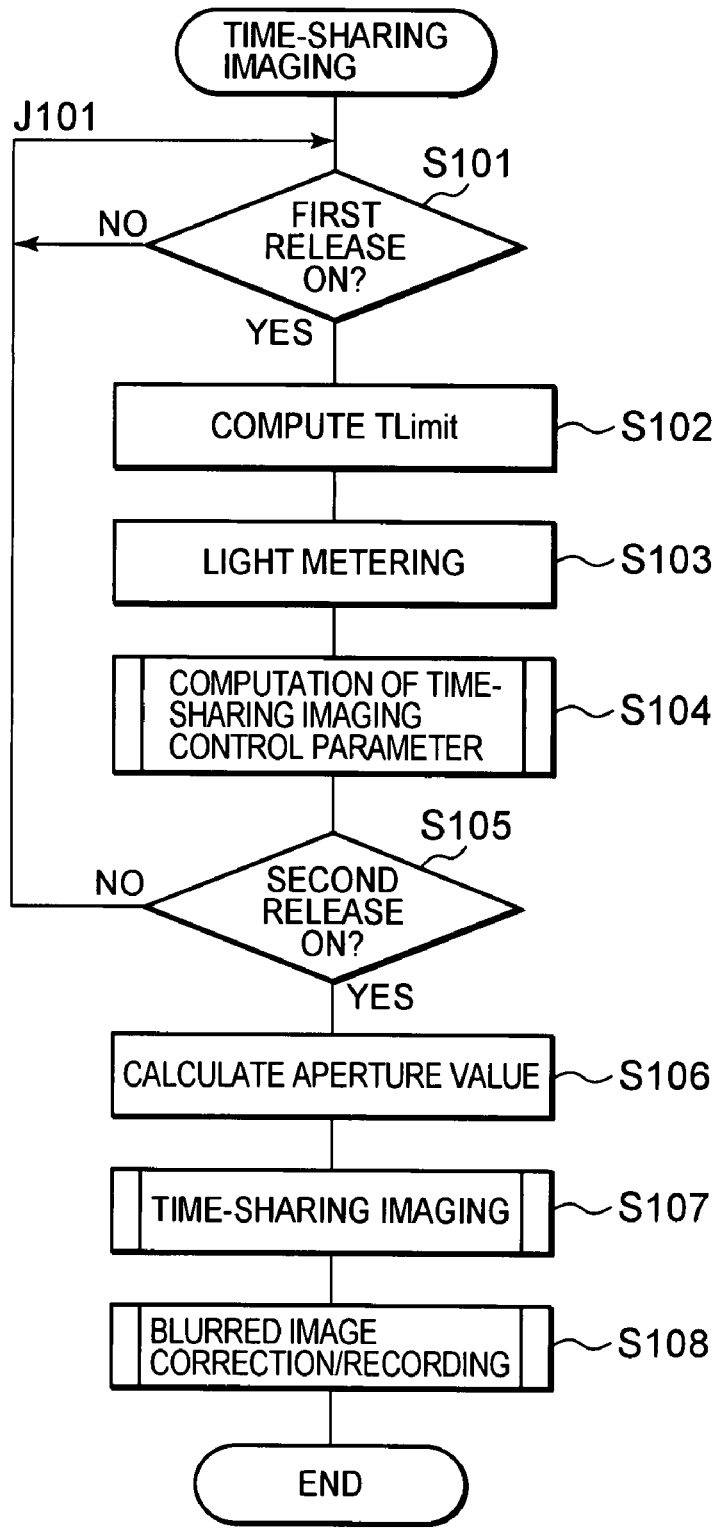
FIG. 4 is a flowchart showing a time-division imaging operation of the digital camera of the embodiment.
Figure 5:
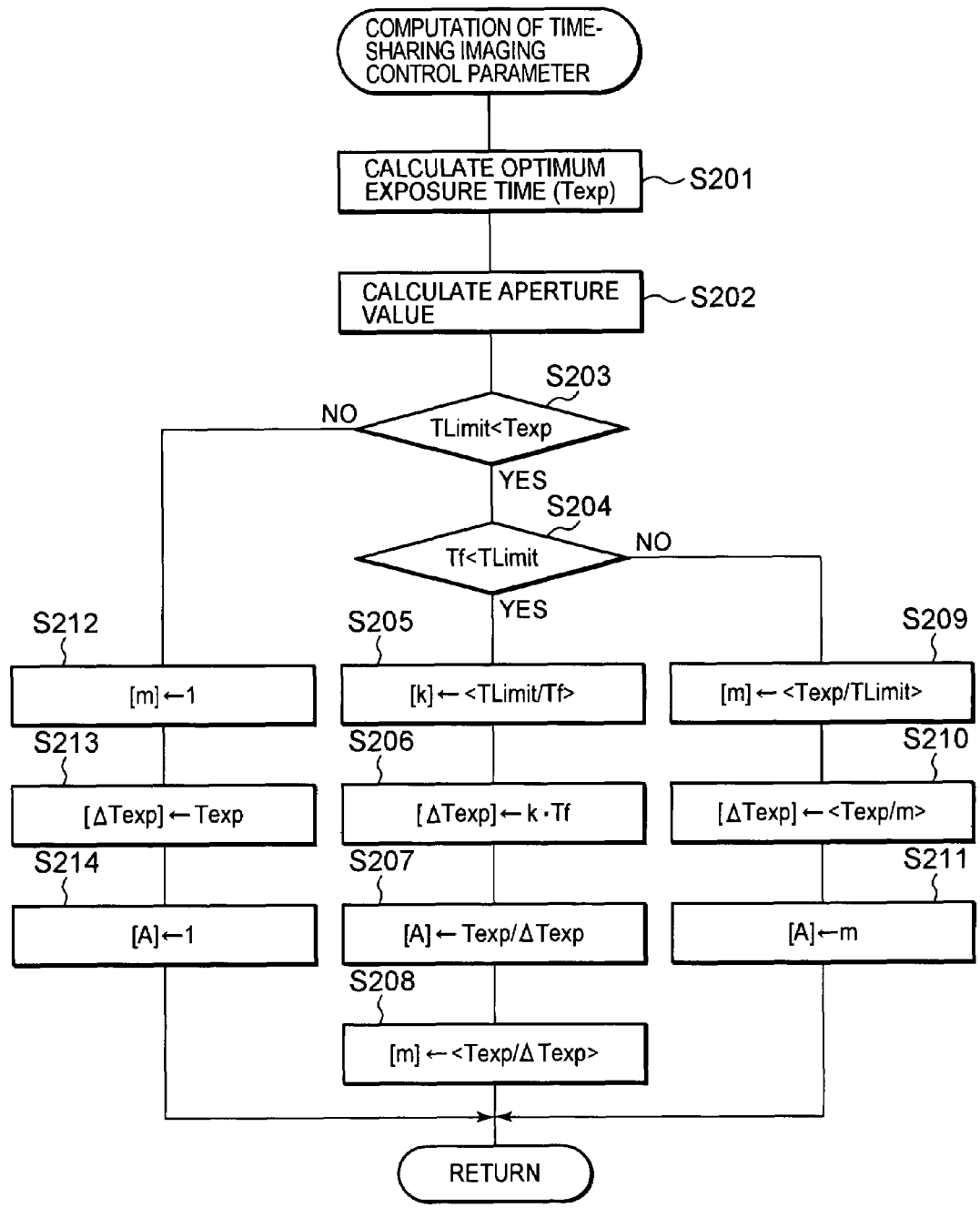
FIG. 5 is a flowchart showing the operation of computation of time-division imaging control parameters in the digital camera of the embodiment.

Returning to step S105 in FIG. 4, it is determined whether the second release switch 19b is on-state. As a result of the determination, if it is off-state, the procedure is diverged to J101 to repeat the above-mentioned processing steps S101 to S104 and wait until the second release switch 19b is turned on. During this waiting period, if the first release switch 19a is also turned off, the procedure returns to step S101. Then, in step S105, when the second release switch 19b is turned on, the procedure goes to step S106 in which an aperture value is set to start the imaging operation. Here, since the aperture 17 is in its maximum open state, the aperture drive system 18 is controlled to narrow the aperture to an aperture value obtained in step S106.

Figure 8:
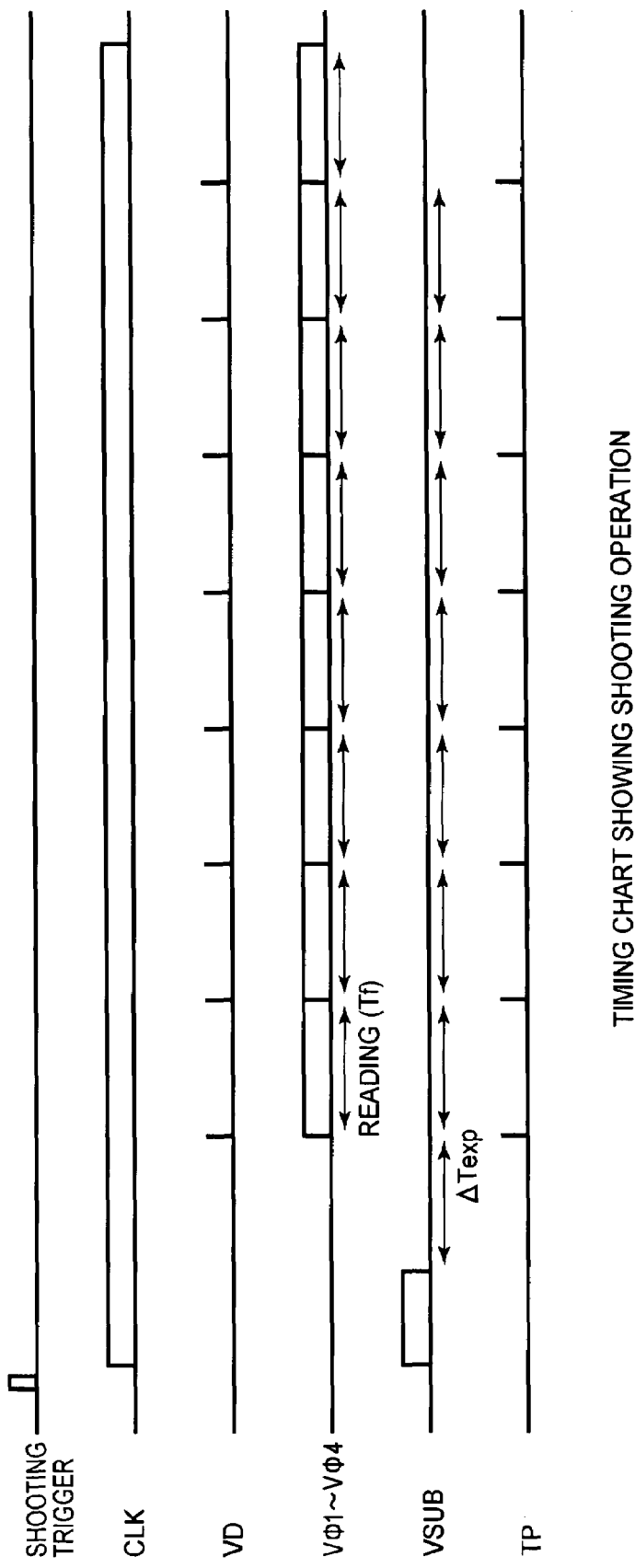
FIG. 8 is a timing chart showing a shooting operation of the digital camera of the embodiment.
Figure 9:
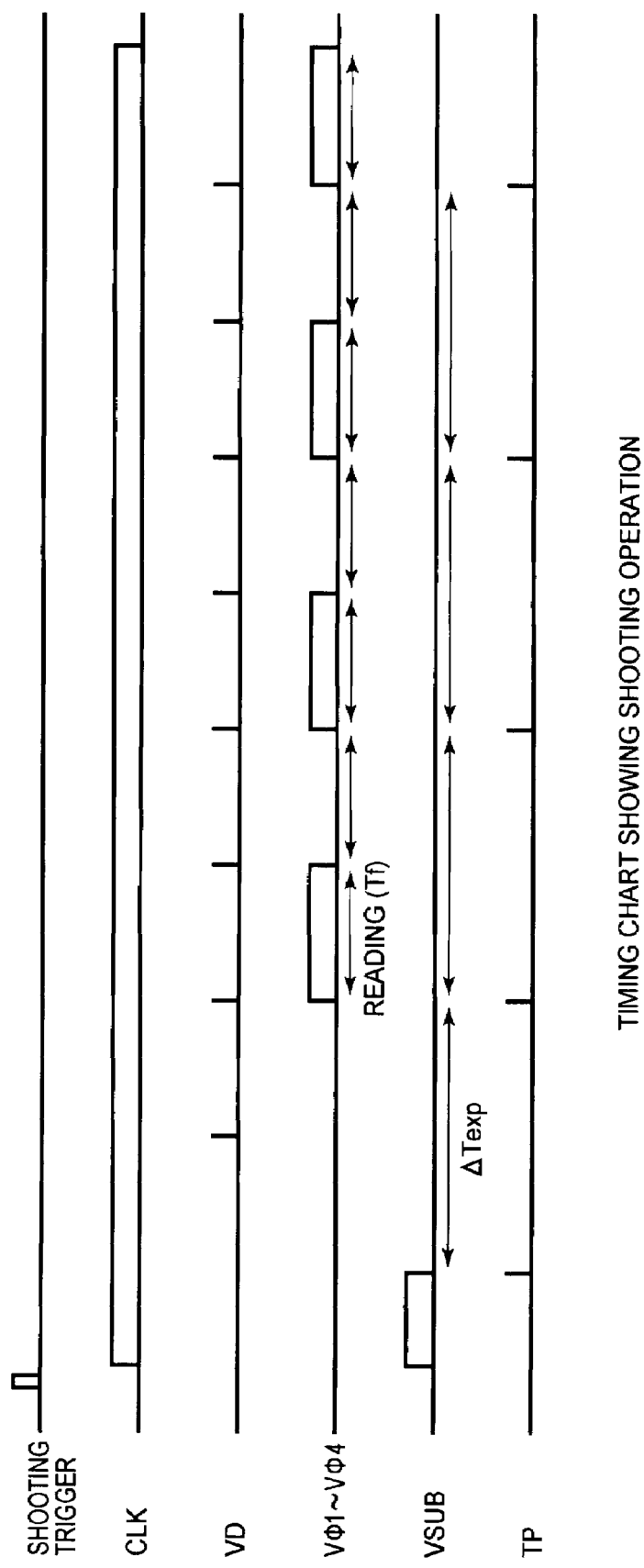
FIG. 9 is a timing chart showing another shooting operation of the digital camera of the embodiment.
Figure 10:
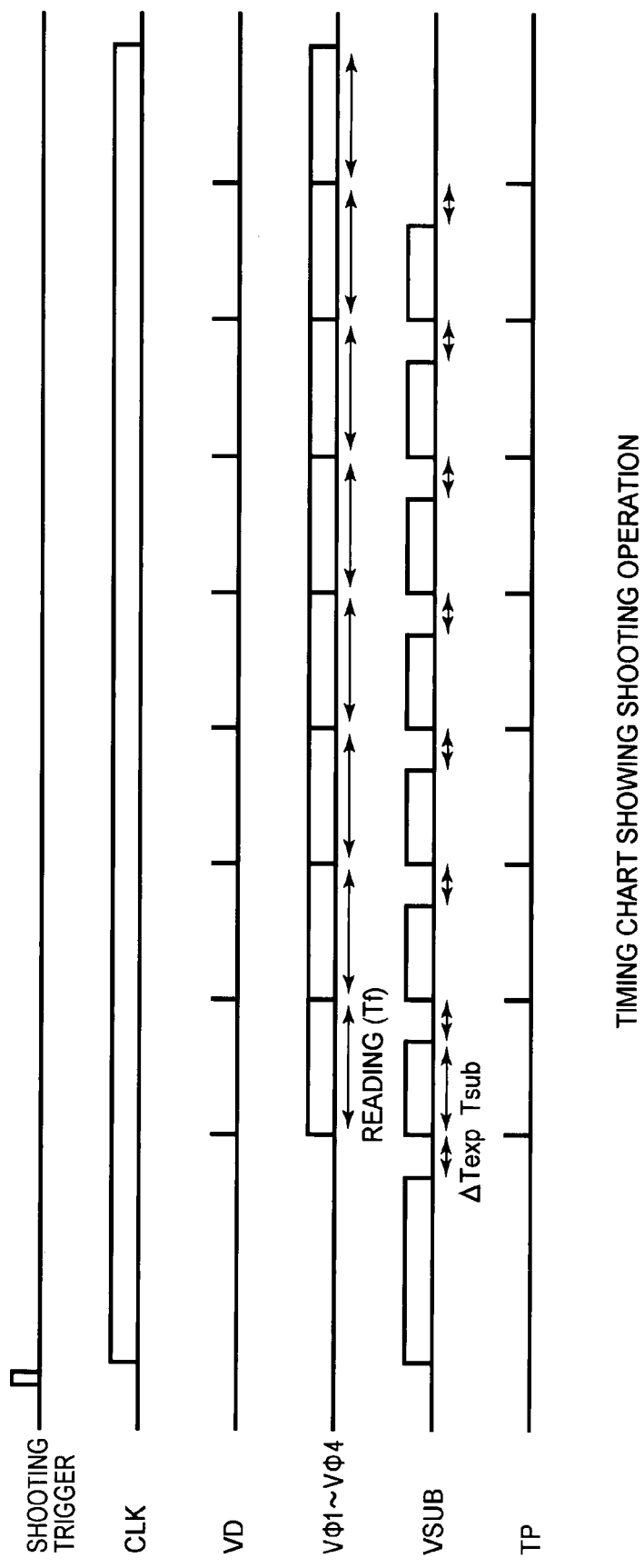
FIG. 10 is a timing chart showing still another shooting operation of the digital camera of the embodiment.

After completion of narrowing the aperture, the procedure goes to step S107 to perform time-division imaging. This time-division imaging will be described below with reference to timing charts shown in FIGS. 8 to 10. FIG. 8 shows an example in which time-division imaging is performed eight times at a time-division exposure time ΔTexp equal to the image reading cycle Tf. FIG. 9 is another example in which time-division imaging is performed four times at a time-division exposure time ΔTexp that is twice as long as the image reading cycle Tf. FIG. 10 shows still another example in which the time-division imaging is performed eight times at a time-division exposure time ΔTexp shorter than the image reading cycle Tf. The following describes the operation of the time-division imaging with reference to these figures.

The description will first be given for the case of FIG. 8. This is a case where the image reading cycle Tf is equal to the time-division exposure time ΔTexp. In this case, the procedure follows the YES branch from step S204 in FIG. 5 to set [k]=1 in step S205 and [ΔTexp]=Tf in step S206.

First, when a shooting trigger signal pulse generated in response to turning on the second release switch 19b has fallen, a clock signal CLK is supplied from the timing generator (TG) 5 to the image pickup device 1. Upon receipt of the clock signal CLK, a substrate-applied high-voltage pulse VSUB is repeatedly applied to forcibly discharge the electric charges accumulated in the photodiodes 33, which form pixels of the image pickup device 1, to the semiconductor substrate (vertical overflow drain VOD). Upon completion of the application of this high-voltage pulse VSUB, an exposure is started. In other words, the image pickup device 1 starts the exposure in synch with the falling edge of the high-voltage pulse VSUB. After the exposure time ΔTexp (=Tf) computed in step S206 has elapsed from the falling of the high-voltage pulse VSUB, a shift pulse TP is output to shift the electric charges accumulated in the photodiodes 33 of the image pickup device 1 to the vertical transfer CCDs (VCCDs) 31. Then, the accumulated electric charges are read out as image signals in sync with a vertical sync signal VD and transfer pulses Vφ1 to Vφ4. After completion of the application of the shift pulse TP, the photodiodes 33 of the image pickup device 1 start accumulation of electric charges again. Then, in sync with the next vertical sync signal VD, reading of an image by the second time-division imaging is performed. The above-mentioned sequence of operations are repeated m times (eight times in FIG. 8). As is apparent from the above description, a time period between the start of reading and the next start of reading, i.e., the reading time Tf is the same period as an electric charge accumulation time, i.e., the time-division exposure time ΔTexp.

The case of FIG. 9 will next be described. This is a case where time-division imaging is performed four times at a time-division exposure time ΔTexp that is twice as long as the image reading cycle Tf. In this case, the procedure follows the YES branch from step S204 in FIG. 5 to set [k]=2 in step S205 and [ΔTexp]=2Tf in step S206. In FIG. 9, when the applied voltage of the high-voltage pulse VSUB has fallen, the exposure operation of the photodiodes 33 is started. The time-division exposure time ΔTexp is a period twice as long as the image reading cycle Tf. The shift pulse TP is applied each time the time-division exposure time ΔTexp has passed, and time-division image signals are read out in sync with the vertical sync signal VD and the transfer pulses Vφ1 to Vφ4. These read-out time-division images are stored in the buffer memory 8a as digital images in a manner to be described later. In this case, the amplification factor A of the AMP 3 is computed in step S207 as A=4.

As shown in FIGS. 8 and 9, in the embodiment, the time-division exposure time ΔTexp is set to a period that is an integral multiple of the reading cycle Tf. Therefore, the time-division exposure time ΔTexp is continuously repeated plural times without a break. This enables a smooth representation of a moving body in a blur-corrected image without interrupting the trajectory of the moving body.

The following describes the case of FIG. 10. This is a case where time-division imaging is performed eight times at a time-division exposure time ΔTexp shorter than the image reading cycle Tf. In this case, the procedure follows the NO branch from step S204 in FIG. 5 to determine the number of time-division imaging times [m] in step S209 and the time-division exposure time ΔTexp shorter than the reading cycle Tf in step S210. Like in the case of FIG. 8, when the shooting trigger signal (in response to turning on the second release switch 19b) has fallen and then the high-voltage pulse VSUB has fallen, the exposure operation is started. After the exposure time ΔTexp computed in step S210 for time-division imaging has elapsed, the shift pulse TP is output to shift the electric charges accumulated in the photodiodes 33 of the image pickup device 1 to the vertical transfer CCDs (VCCDs) 31. Then, the accumulated electric charges are read out as image signals in sync with the vertical sync signal VD, and in sync with the start of reading of the image signals, the high-voltage pulse VSUB rises again and is applied to the image pickup device 1 for a predetermined period of time. After completion of application of the high-voltage pulse VSUB, exposure is started again, and reading of an image by the second time-division imaging is performed in sync with the next vertical sync signal VD. The above-mentioned sequence of operations are repeated m times (eight times in FIG. 10). As is apparent from the above description, the exposure time ΔTexp for the time-division imaging corresponds to the time obtained by subtracting the application time Tsub of the high-voltage applied pulse VSUB from the time period between the start of reading and the next start of reading, i.e., from the reading cycle Tf.

The read-out time-division images are stored in the buffer memory 8a as digital images in a manner to be described later. Unlike in normal shooting, in the case of FIG. 10, time-division images captured every discrete exposure time are combined. Therefore, when a body moving at a high speed, for example, a flying ball, is captured as a subject, the resulting image may not match the photographer's intention, such as that the movement of the ball is represented as dots along its trajectory. On the other hand, since each time-division imaging is performed at a limit exposure time or less, blur can be removed from the combined image after subjected to blur correction. Therefore, although a combined image representing a subject moving at a high speed, for example, a flying ball, can be dotted depending on the relationship between the movement of the ball and the reading cycle, it cannot be helped in order to prevent the main subject from getting blurred.

Thus, time-division analog signals are read out from the image pickup device 1 in a time-division manner, and reset noise is removed by the CDS 2 from the time-division analog signals. Then, the time-division analog signals are amplified in an analog manner by the gain control amplifier (AMP) 3. Assuming that an amplification factor or gain for compensating for insufficient image exposure due to time-division imaging is A1 and an amplification factor or gain corresponding to the ISO sensitivity Sv is A2, the amplification factor or gain of this AMP 3 is set to A1×A2. Here, if the normal shooting exposure amount is E1 and the time-division imaging exposure amount is E2, A1=E1/E2. To be more specific, assuming that the time-division imaging is performed m times, each with exposure time Texp/m(=ΔTexp) obtained by equally dividing, by m, the exposure time Texp for obtaining optimum exposure, the gain in each time-division imaging is $$A1 = Texp/(Texp/m) = m \quad (3)$$

In the gain control amplifier (AMP) 3 shown in FIG. 3, there are separately provided the amplifier 23 having gain A1 for m-fold amplification of the output signal from the CDS 2 according to the number of time-division imaging times, m, and the amplifier 24 having gain A2 for amplification of the output signal from the CDS 2 according to the ISO sensitivity. These amplifiers are connected in series. In such a structure, any gain can be set easily by multiplying the gain of the amplifier 23 and the gain of the amplifier 24 together.

The analog image signals amplified by the gain control amplifier (AMP) 3 are converted by the A/D converter 4 into digital signals according to the signal supplied from the timing generator 5. The image signals converted by the A/D converter 4 into the digital signals undergo predetermined image processing in the information processing part 8, and stored in the buffer memory 8a inside the information processing part.

Returning to FIG. 4, after completion of the time-division imaging (S107), the procedure goes to step S108 to execute a blurred image correction/recording subroutine in which a combined image with blurring corrected is generated and recorded on the recording medium 11. This subroutine will be described with reference to the flowcharts of FIGS. 6 and 7. First, a mutual blurring compensation for compensating for the mutual blurring of images obtained from m time-division exposures and stored in the buffer memory 8a, and a blurred image correction for generating a combined image from these mutually blur-compensated images are performed (S301).

Figure 7:
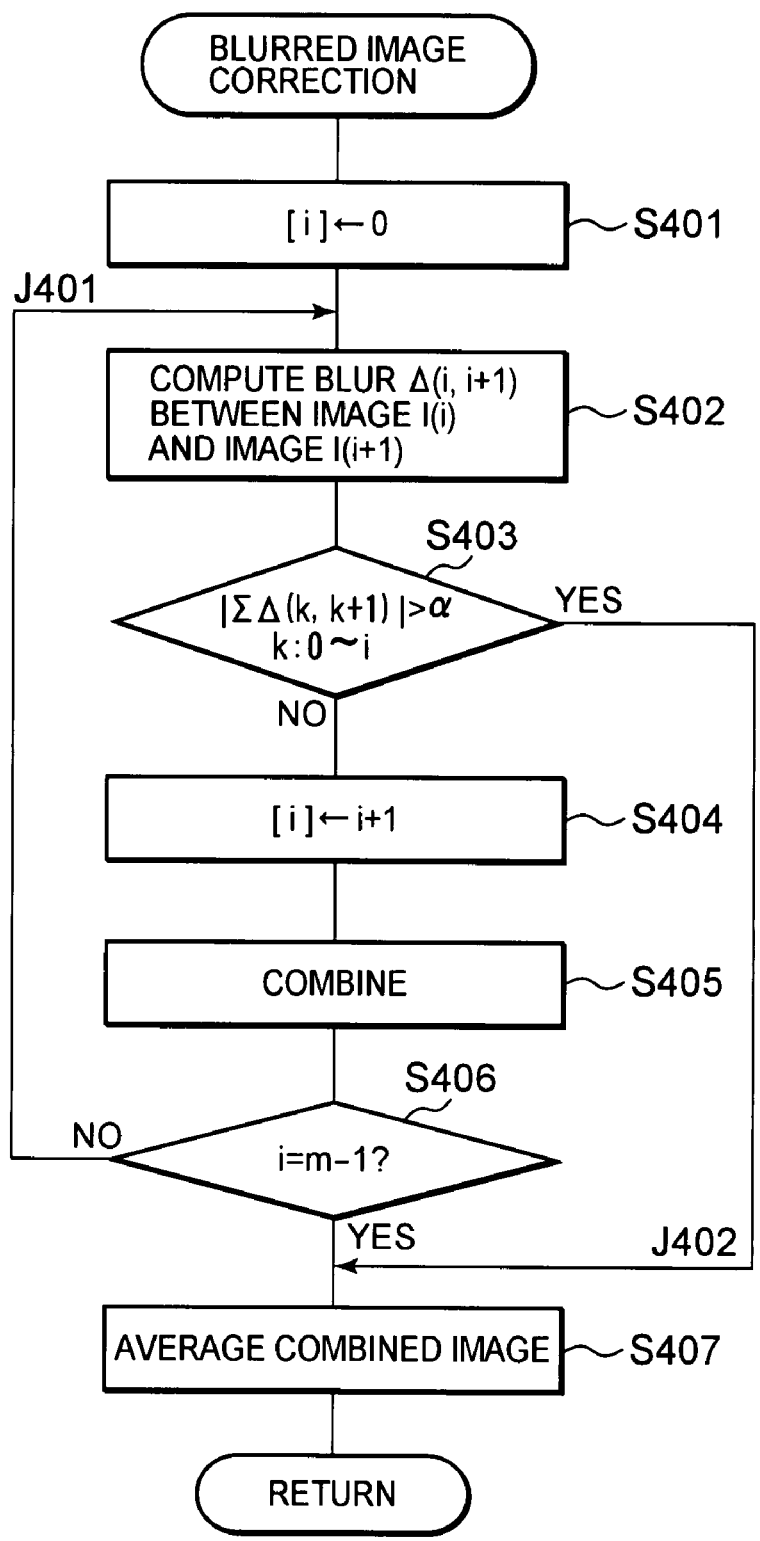
FIG. 7 is a flowchart showing the operation of a blurred image correction subroutine in the digital camera of the embodiment.

Hereinafter, a flow of blurred image correction performed by the information processing part 8 in this blurred image correction subroutine will be described with reference to FIG. 7.

First, as an initial setting, 0 is stored in memory [i] for storing variable i corresponding to ID for identifying each divided image (S401). Then, a relative blur $\Delta(i, i+1)$ between image I(i) and image I(i+1) is computed (S402). The blur $\Delta$ can be determined by setting several characteristic points of the image I(i) by determining the positions of characteristic points of the image I(i+1) corresponding to the characteristic points of the image I(i) by a known motion vector calculation technique, and determining relative displacement between these corresponding positions. The blur $\Delta$ is a vector.

Next, the procedure goes to step S403 to compute a scalar value $|\Sigma\Delta(k, k+1)|$ of $\Sigma\Delta(k, k+1)$ (where k=0–i) of the integrated blur $\Delta$ and compare this value with a predetermined value $\alpha$. As a result of the comparison, if not $|\Sigma\Delta(k, k+1)|>\alpha$, i.e., when the integrated value of blur is smaller than the predetermined value but the blur is not so significant, blur correction is possible. In this case, the procedure goes to step S404 to increment the content of the memory [i] by one. Then, the relative blur between the image I(i) and the image I(i+1) is compensated for based on the blur $\Delta$, and corresponding pixel values are added (combined) (S405). After that, in step S406, i and m−1 are compared, where m is the number of time-division imaging times set in step S208, S209 or S212, i.e., the number of images obtained by the time-division imaging, and m−1 is the number of times the blur compensation processing is performed. As a result of comparison, if not i=m−1, the procedure is diverged to J401 to return to step S402 to repeat the above-mentioned processing. On the other hand, as a result of comparison, if i=m−1, the procedure goes to step S407 to compute an average value of the images compensated for mutual blurring and combined together, thereby obtaining a combined image after subjected to the blur compensation processing.

On the other hand, as a result of determination in step S403, if $|\Sigma\Delta(k, k+1)|>\alpha$, the total amount of blur during the time-division imaging is determined to be larger than a tolerable value, i.e., a value at which it is difficult to secure sufficient effective areas, and the procedure is diverged to J402 to shift to step S407. In this case, the blur compensation processing is not performed, resulting in a blurred image.

Figure 6:
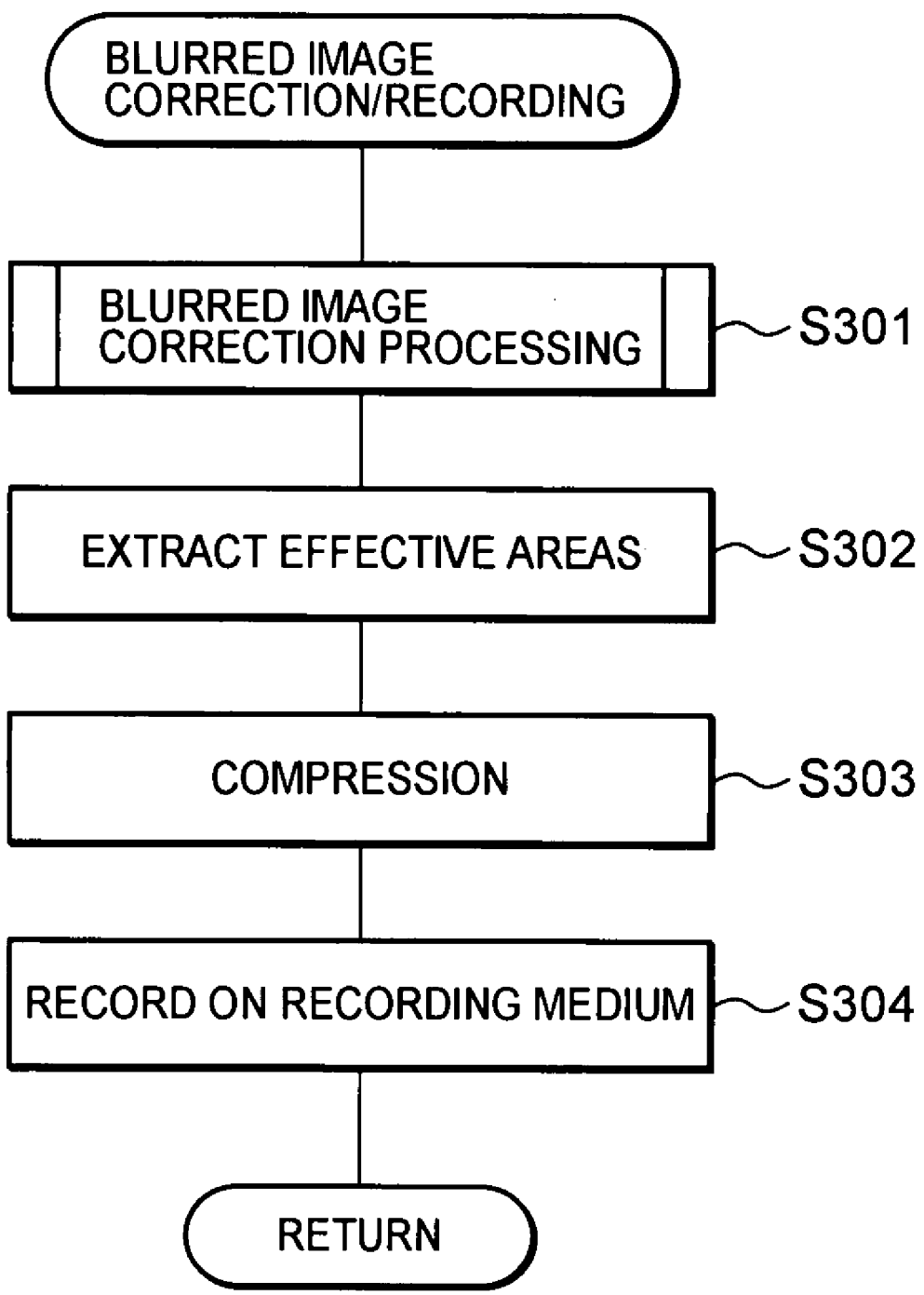
FIG. 6 is a flowchart showing a blurred image correction and recording subroutine in the digital camera of the embodiment.

After completion of averaging of the combined image in step S407, the blurred image correction subroutine is completed, and the procedure returns to the blurred image correction/recording subroutine shown in FIG. 6. Then, in step S3202, effective areas are extracted. In the information processing part 8, time-division images having blur amounts equal to or larger than a predetermined amount with respect to the blur amount of the first captured time-division image are excluded from combining targets so that overlapping areas of all the remaining time-division images will fall within a predetermined range of effective areas. Then, from among the time-division images having blur amounts within the predetermined range, images within a predetermined range with respect to the first captured time-division image in the combined images are extracted. This makes it easy to extract effective areas equal to or more than the predetermined range.

Next, the procedure goes to step S303 to temporarily store the effective areas of image data in the DRAM 9. Then, the temporarily stored image data is compressed into image data in a predetermined format such as JPEG by means of the compression/decompression part 10. Then, in step S304, the compressed image data is recorded on the recording medium 11, and the blurred image correction/recording subroutine is completed to return to the time-division imaging routine in FIG. 4.

The following describes an alternative example of the gain control amplifier (AMP) 3 in the embodiment. The AMP 3 in the embodiment includes the amplifier 23 having gain A1 and the amplifier 24 having gain A2, both provided separately and connected in series, to set the gain A1 according to the number of time-division imaging times and the gain A2 according to the ISO sensitivity, respectively, thereby making it possible to easily obtain any gain. In this structure, however, the circuit structure is complicated. Further, the amplifiers are connected in two stages and this could increase noise. Since the gain A1 of the amplifier 23 and the gain A2 of the amplifier 24 are interrelated so that A1×A2 can take on almost constant values, it is possible for a single amplifier to share the amplifier 23 and the amplifier 24. The following describes this point in detail.

When the amplification factor or gain of the amplifier 24 is multiplied by k to multiple the ISO sensitivity by k (=log m/log 2 [stage]), the exposure time becomes 1/k (Texp/k sec.). Therefore, the number of time-division exposure times m' becomes m'=(Texp/k)/TLimit=(Texp/TLimit)/k=m/k (where Texp/TLimit is equal to the number of time-division exposure times before multiplying the ISO sensitivity by k).

In the meantime, since the signal level of the time-division images becomes 1/m' of the optimum level, it is desired to amplify the time-division images by a factor of m' before A/D converted to digital signals in order to reduce the quantization noise of the A/D converter 4 to almost the same level as in a normal shooting. Then, the plurality of analog-to-digital converted, time-division images are compensated for mutual blurring, and the plurality of blur-compensated, time-division images are combined. After that, this combined image is averaged to create a blur-compensated, combined image. Thus, the gain in the conversion of the time-division images becomes m'/m=1/k. Then, the total gain of the image signals before A/D conversion becomes a value obtained by multiplying the gain of the time-division images and the gain based on the ISO sensitivity.

Therefore, the variation in total gain before and after changing the ISO sensitivity is equal to k×1/k=1 obtained by multiplying the gain variation k based on the change in ISO sensitivity and gain variation 1/k across the time-division images. This means that the total gain is kept constant even if the ISO sensitivity is changed, indicating that the amplifier circuit for setting the ISO sensitivity and the amplifier circuit for amplifying the time-division images can be combined as a single amplifier circuit.

Figures 11, 12:
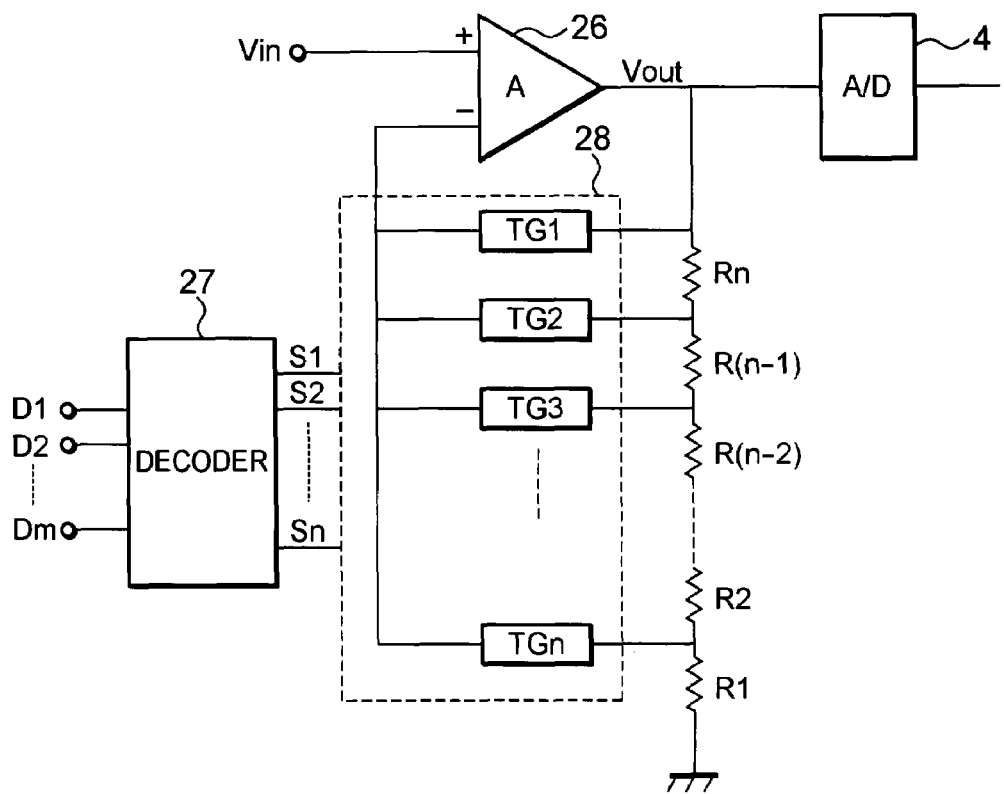
FIG. 11 is a block diagram showing an alternative example of the gain control amplifier AMP in the digital camera of the embodiment.
FIG. 12 is a table showing the relationship among input signal, ISO sensitivity, and gain in the gain control amplifier AMP of the digital camera of the embodiment.

FIG. 11 shows an alternative example in which a single amplifier serves as both the amplifier 23 and the amplifier 24. The non-inverting input of a differential amplifier 26 is connected to the output of the CDS 2, while the inverting input is connected to one end of an analog switch circuit 28. The analog switch circuit 28 has n analog switches TG1, TG2, ..., TGn, one end of each of which is connected to the inverting input of the differential amplifier 26 as mentioned above, with the other end connected to each connection point between series-connected resistors Rn, R(n−1), R(n−2), ... R2, R1. In other words, the other end of the analog switch TGn is connected to a connection point between the resistor R1 and the resistor R, the other end of the analog switch TG2 is connected to a connection point between the resistor R(n−1) and the resistor Rn, and the other end of the analog switch TG1 is connected to a connection point between the resistor Rn and the output of the differential amplifier 26. The other end of the resistor R1 is grounded, and the output of the differential amplifier 26 is also connected to the A/D converter 4.

Each control terminal of the analog switch 28 is connected to each output of a decoder 27, respectively. The decoder 27 is to convert binary input signals D1, D2, ..., Dm into output signals S1, S2, ..., Sn. When this Sx (x=1, 2, 3, ..., n) is "1" ("H" level), it means that the analog switch TGx (x=1, 2, 3, ..., n) is on-state. If a value resulting from converting each input signal D1, D2, ..., Dm into a decimal value is, for example, x, only the output signal Sx among the output signals S1, S2, ..., Sn from the decoder 27 becomes "1" and the other output signals are all "0s." For example, if the analog switch TGn is turned on, the output Vout of the differential amplifier 26 is $$Vout=Vin \cdot (Rn+R(n-1)+R(n-2)+ \ldots R2+R1)/R1$$

As an example, if m=3, n=8, R1=100Ω, R3=200Ω, R4=400Ω, R5=800Ω, R6=1.6 kΩ, R7=3.2 kΩ, R8=6.4 kΩ, gains as shown in FIG. 12 are obtained for the input signals D1, D2, and D3, respectively.

Suppose that the gain and the ISO sensitivity are associated with each other as shown in FIG. 12. In this case, when the gain is ×32 or more, there is no associated ISO sensitivity. This is because amplification is made according to the number of time-division imaging times, m. In the example of FIG. 12, the gain A1 for compensating for insufficient image exposure due to time-division imaging needs to be changed in multiples of 2. Therefore, in this example, the number of time shares is set, for example, any one of 1, 2, 4, and 8. Specifically, the number of time-division imaging times, m, is determined as follows: First, assuming that the normal shooting exposure time is Texp, Texp/TLimit is computed by dividing Texp by the blur limit exposure time TLimit. Next, a value larger than Texp/TLimit and the smallest in 1, 2, 4, and 8 is selected. For example, if Texp/TLimit=2.55, the number of time-division imaging times, m, is 4. Therefore, in this case, since the gain A of the differential amplifier 26 is ×4, the ISO sensitivity is shifted by two steps toward higher ISO sensitivities.

In the alternative example as mentioned above, the ISO sensitivity is selected in integral multiple steps, but it can be designed to arbitrarily select the resistors R1, R2, R3, ..., Rn so that the ISO sensitivity can be selected, for example, every ⅓ step. It can also be so designed that any integral value can be selected for the gain A.

In the embodiment and the alternative example thereof, a plurality of images acquired by time-division imaging are read from the image pickup device 1, converted to digital images, and subjected to a blur compensation and synthesis processing to generate a blur-corrected, combined image. The invention described in the embodiment and the alternative example thereof can also be applied to an apparatus as disclosed in Japanese Patent Application No. 2005-278748 filed by the present applicant, in which time-division imaging and blur compensation/image synthesis processing are performed inside an image pickup device.

As described above, according to the embodiment, the exposure time ΔTexp for time-division imaging is set to k×Tf, where Tf is the cycle of reading a time-division image, TLimit is the blur tolerable exposure time, and k is a value obtained by rounding down the fractional part of the real number TLimit/Tf. Therefore, the exposure time for the time-division imaging can be set to the maximum exposure time that is shorter than the blur tolerable exposure time TLimit and an integral multiple of the cycle of reading a time-division image, Tf. This can ensure the maximum signal level for time-division exposure.

Further, if the exposure time necessary for obtaining the optimum amount of exposure is expressed as Texp, the time-division images are amplified at an amplification factor of Texp/ΔTexp, thereby making it possible to obtain time-division images having an optimum level. Further, A/D conversion is performed after amplification, and this can minimize quantization noise upon A/D conversion.

Further, if m is set to a value obtained by rounding up the fractional part of the real number Texp/ΔTexp, since the time-division imaging is performed m times, and the resulting time-division images are compensated for mutual blurring and combined together, a combined image compensated for blur and having proper S/N can be obtained.

Further, as described above, according to the invention of the embodiment, since time-division images acquired in continuous exposure time periods are compensated for mutual blurring and combined together, a combined image compensated for mutual blurring and having an optimum level of S/N can be generated. Therefore, an image equivalent to that acquired in normal shooting can be obtained except that a blur is corrected.

In the embodiment, since the solid-state image pickup device 1 converts subject light to an image signal, it can be called an imaging part. On the other hand, the CPU 7 for controlling the TG 5 reads time-division images, each captured at a predetermined time-division exposure time, from the solid-state image pickup device 1, and hence it can be called an image reading part. The CPU 7 also controls the time-division exposure time to be an integral multiple of the image reading cycle, and hence it can also be called a time-division exposure time control part. Further, the CPU 7 can be called a blur compensation part because it compensates for mutual blurring of a plurality of images captured by the image pickup device, and an image synthesis part because it combines the plurality of images compensated by the blur compensation part.

Furthermore, the CPU 7 can be called an exposure time computing part because it computes the exposure time Texp necessary for obtaining a constant exposure time, and a comparison part because it compares the cycle of reading a time-division image from the image pickup device with a blur tolerable exposure time. The AMP 3 amplifies an image read by the CPU 7 and processed by the CDS 2, and hence it can be called an image amplification part.

The aforementioned embodiment has described an example of application of the present invention to a digital camera. As the digital camera, the present invention can be applied to a single-lens reflex digital camera or a compact digital camera, or to an electronic imaging apparatus incorporating a digital camera therein.

While there has been shown and described what is considered to be a preferred embodiment of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. An electronic blur correction device for generating a blur-compensated combined image by compensating mutual blurring among a plurality of time-division images continuously acquired from an image pickup device, the device comprising:
an image pickup device for capturing a plurality of time-division images, each of which is exposed with a predetermined time-division exposure time;
an image reading part for continuously reading each of the plurality of time-division images from the image pickup device at a predetermined reading cycle;
a time-division exposure time control part for controlling the predetermined time-division exposure time to be an integral multiple of the predetermined reading cycle of the image reading part;
a blur compensation part for compensating for mutual blurring of the plurality of time-division images captured by the image pickup device; and
an image synthesis part for combining the plurality of the time-division images compensated by the blur compensation part.

2. The electronic blur correction device according to claim 1 wherein the time-division exposure time is shorter than a blur tolerable limit exposure time.

3. The electronic blur correction device according to claim 1 further comprising:
an exposure time computing part for computing an exposure time (Texp) necessary for obtaining a fixed amount of exposure; and
an image amplification part for amplifying the images read by the image reading part,
wherein when an amplification factor of the image amplification part is A and the time-division exposure time is ΔTexp, A=Texp/ΔTexp.

4. The electronic blur correction device according to claim 1 further comprising
a comparison part for comparing the predetermined reading cycle with a blur tolerable exposure time,
wherein when the predetermined reading cycle of reading the time-division images is shorter than the blur tolerable exposure time as a result of comparison by the comparison part, the time-division exposure time control part sets the time-division exposure time to be an integral multiple of the predetermined reading cycle.

5. The electronic blur correction device according to claim 4 wherein when the predetermined reading cycle of each of the time-division images is Tf, the blur tolerable exposure time is TLimit, and a value obtained by either rounding down or rounding up the fractional part of a real number TLimit/Tf is k, an exposure time ΔTexp for the time-division imaging is set to k×Tf.

6. The electronic blur correction device according to claim 5 further comprising:
an exposure time computing part for computing an exposure time (Texp) necessary for obtaining a preferable amount of exposure on the basis of an APEX operation; and an image amplification part for amplifying the time-division images, wherein an amplification factor A of the image amplification part is set to $T_{exp}/\Delta T_{exp}$.

7. The electronic blur correction device according to claim 6 wherein the time-division imaging is performed m times, where m is a value obtained by either rounding up or rounding down the fractional part of the real number $T_{exp}/\Delta T_{exp}$.

8. An electronic blur correction method for generating a blur-compensated combined image by compensating mutual blurring among a plurality of time-division images continuously acquired from an image pickup device, the method comprising:

a step for capturing a plurality of time-division images, each of which is exposed with a predetermined time-division exposure time;

a step for continuously reading each of the plurality of time-division images from the image pickup device at a predetermined reading cycle;

a step for compensating mutual blurring of the plurality of time-division images captured by the image pickup device; and a step for combining the plurality of mutually blur-compensated time-division images, wherein the predetermined time-division exposure time is equal to an integral multiple of the predetermined reading cycle.

9. An electronic blur correction device for generating a blur-compensated combined image by compensating mutual blurring among a plurality of time-division full-frame images continuously acquired from an image pickup device, the device comprising:

an image pickup device for capturing a plurality of time-division full frame images, each of which is exposed with a predetermined time-division exposure time;

an image reading part for continuously reading each of the plurality of time-division full-frame images from the image pickup device at a predetermined reading cycle;

a time-division exposure time control part for controlling the predetermined time-division exposure time as a function of (1) a blur limit exposure time, (2) an exposure time, and (3) the predetermined reading cycle of the image reading part;

a blur compensation part for compensating for mutual blurring of the plurality of time-division full-frame images captured by the image pickup device; and an image synthesis part for combining the plurality of the time-division full-frame images compensated by the blur compensation part.

* * * * *